SINGLE STATION MULTI-MASTER GEAR GAUGE

Filed Oct. 27, 1961 5 Sheets-Sheet 1

INVENTORS
THOMAS S. GATES
CARL H. MOTZ
RUSSELL W. ANTHONY
JOEL BECKMAN JR.
LILY SKALSEY
BY Whittemore, Hulbert & Belknap ATTORNEYS

SINGLE STATION MULTI-MASTER GEAR GAUGE

Filed Oct. 27, 1961 5 Sheets-Sheet 2

INVENTORS
THOMAS S. GATES
CARL H. MOTZ
RUSSELL W. ANTHONY
JOEL BECKMAN JR.
BY LILY SKALSEY
Whittemore, Hulbert & Belknap
ATTORNEYS

SINGLE STATION MULTI-MASTER GEAR GAUGE

Filed Oct. 27, 1961 5 Sheets-Sheet 3

INVENTORS
THOMAS S. GATES
CARL H. MOTZ
RUSSELL W. ANTHONY
JOEL BECKMAN JR.
BY LILY SKALSEY
Whittemore, Hulbert & Belknap ATTORNEYS.

INVENTORS
THOMAS S. GATES
CARL H. MOTZ
RUSSELL W. ANTHONY
JOEL BECKMAN JR.
BY LILY SKALSEY
Whittemore, Hulbert & Belknap
ATTORNEYS.

SINGLE STATION MULTI-MASTER GEAR GAUGE

Filed Oct. 27, 1961

5 Sheets-Sheet 5

INVENTORS
THOMAS S. GATES
CARL H. MOTZ
RUSSELL W. ANTHONY
JOEL BECKMAN JR.
LILY SKALSEY
BY Whittemore, Hulbert & Belknap
ATTORNEYS

United States Patent Office 3,214,842

Patented Nov. 2, 1965

3,214,842

SINGLE STATION MULTI-MASTER GEAR GAUGE

Thomas S. Gates, Grosse Pointe Woods, Carl H. Motz, East Detroit, and Russel W. Anthony, Detroit, Mich., and Joel Beckman, Jr., Galion, Ohio, and Lily G. Skalsey, Detroit, Mich., assignors to National Broach & Machine Company, Detroit, Mich., a corporation of Michigan Filed Oct. 27, 1961, Ser. No. 148,218

30 Claims. (Cl. 33—179.5)

The present invention relates to a single station multi-master gear gauge.

The gauge disclosed herein is adapted to receive work gears which are rotated in mesh with a plurality of gear-like elements and a plurality of gear characteristics are determined during a single rotation of the gear-like elements in mesh with the gear. In general, the gear characteristics which are checked are size, pitch diameter runout or eccentricity, nicks, tooth spacing, lead, crown, involute and angular velocity of the work gear.

In general, these characteristics are determined either by center distance variation between the work gear and the check gears, or by relative angular or circumferential displacement between one or more of the gears in mesh with the work gear, or between a master gear and a gear in mesh therewith.

Relatively small variations in center distance and/or angular displacement between the gear elements are measured by sensitive means preferably electrical in nature, such for example as linear variable displacement transformers. The transformers will have a variable output dependent upon the position of a displaceable core element and the variation in electrical output may be made to actuate gear sorting mechanism. On the other hand, the output of the transformers may be fed to indicators and/or recording devices such for example as styli movable over a progressively movable record tape. Finally, the output of the transformers may be fed into analytical computers which will not only compute specific gear characteristics from variations in electrical input but may also be used to average errors or deviations from a norm, and to sort gears in accordance with average results rather than individual readings.

With the foregoing general description in mind, it is an object of the present invention to provide a single station multi-master gear gauge including means for rotating a work gear in mesh with a plurality of relatively angularly movable gear-like gauge elements, and to measure angular displacement between certain of said gauge elements to determine different gear characteristics.

It is a further object of the present invention to provide a gear gauge of the character described including a plurality of relatively angularly movable gear-like gauge elements, a corresponding circumferential portion of which includes teeth adapted to contact substantially the entire surface of the teeth of the work gear so as to search the entire working surface of the teeth of the work gear for nicks.

It is a further object of the present invention to provide a nick detector comprising gear-like gauge structure rotatable with a work gear in contact with substantially the entire surface of the teeth of the work gear, and means for permitting center distance displacement between the work gear and gear-like gauge structure when a nick, burr or other minor protuberance engages a surface of the gear-like gauge structure.

It is a further object of the present invention to provide a gauge comprising gear-like gauge elements adapted to mesh with end portions of the work gear, in combination with means for sensing angular displacement between said gear-like gauge elements to determine the lead or helix angle of the teeth of the gear.

It is a further object of the present invention to provide a relatively thin gear-like gauge element rotatable in mesh with a work gear intermediate the ends thereof, one or more additional rotatable gear-like gauge elements in mesh with one or more end portions of the teeth of the work gear, and means for determining relative angular position between the gear-like gauge element intermediate the ends of the gear teeth and one or both of the additional gear-like gauge elements to determine the condition of crown of the teeth.

It is a further object of the present invention to provide a rotatable gear-like gauge element having teeth in mesh with the teeth of a work gear, the teeth of a predetermined circumferential zone of said gear-like gauge element comprising a succession of relatively thin teeth adapted to remain out of contact with the teeth of the work gear, followed by a single relatively thicker tooth adapted to engage one side of a tooth space of the work gear, means for observing rotational displacement of the gear-like gauge element as the single relatively thick tooth thereof passes through involute contact with a tooth of the work gear as a function of involute or tooth form error.

It is a further object of the present invention to provide apparatus as described in the preceding paragraph which comprises means for driving the work gear and gear-like gauge element in rotation, and means for reducing the rate of rotation during passage of the single relatively thick tooth of the gear-like gauge element through contact with the work gear.

It is a further object of the present invention to provide apparatus as described in the preceding paragraphs in which a pair of gear-like gauge elements are provided with aligned relatively thicker teeth, means for biasing said gauge elements in opposite directions in order to effect a comparison of tooth form or involute shape at opposite sides of a tooth space from the work gear during passage of said relatively thick teeth.

It is a further object of the present invention to provide a gear gauge comprising a rotary support for a work gear, a spindle parallel to said work gear, a plurality of relatively angularly movable gear-like gauge elements on said spindle, one of which is fixed to said spindle, said gear-like gauge elements being in position to mesh simultaneously with the work gear, a first master gear coaxial with said work gear, means for mounting said master gear for rotation with said work gear, a pair of relatively angularly movable master gears on said spindle in mesh with said first master gear, resilient means acting between said pair of master gears urging corresponding teeth thereof out of axial alignment, and equalizer means connected between said pair of master gears effective to assure neutral positioning of sensing elements.

Other objects and features of the invention will become apparent as the description proceeds, especially when taken in conjunction with the accompanying drawings, illustrating preferred embodiments of the invention, wherein.

Figure 1:
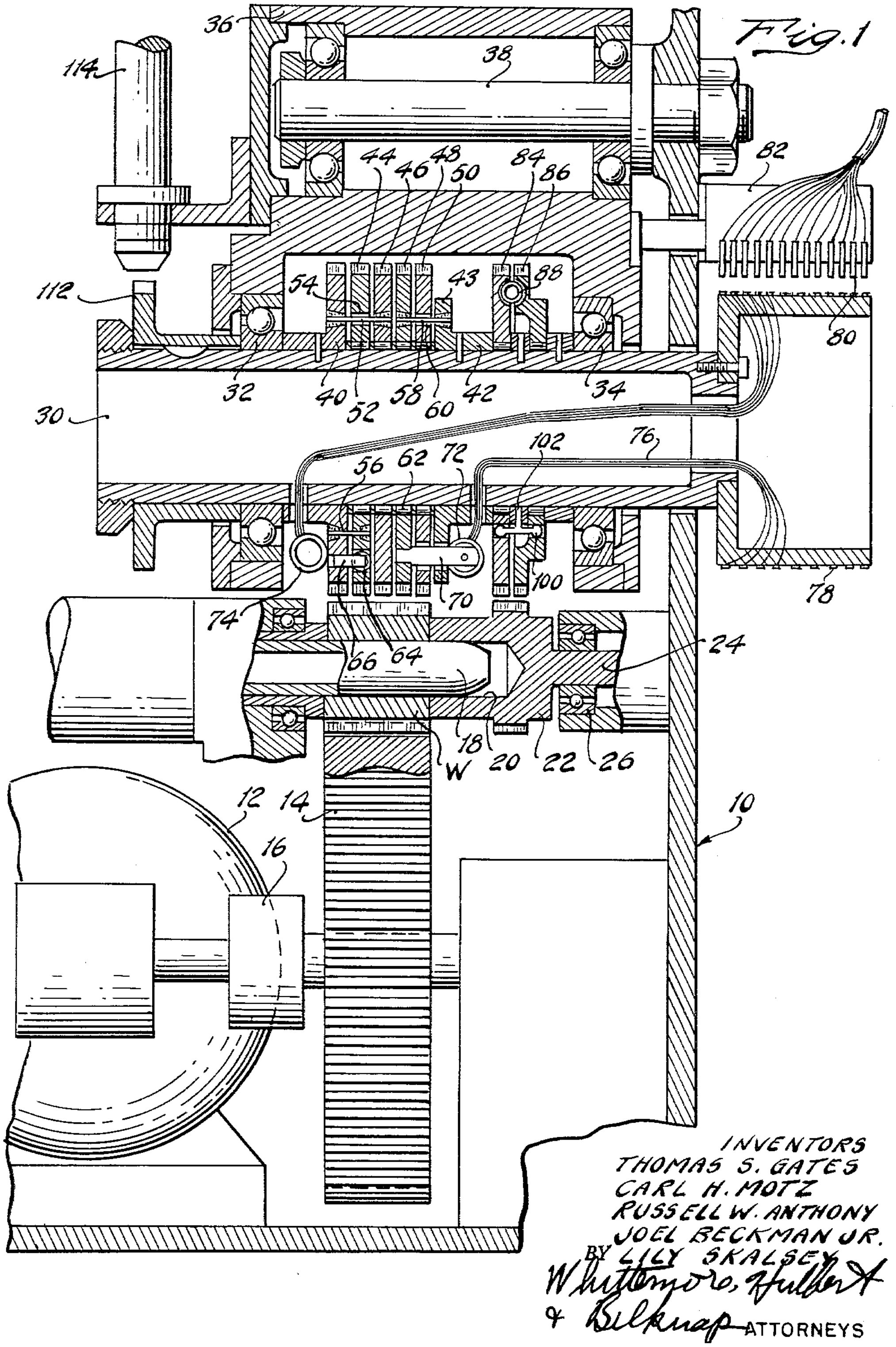
FIGURE 1 is a somewhat diagrammatic sectional view illustrating the mechanical structure of the gauge.

Referring first to FIGURE 1, the gear gauging mechanism is shown as comprising a frame 10 supporting a motor 12 connected to a gear 14 by suitable coupling means indicated at 16. The gear 14 meshes with a work gear W which is supported on an expanding arbor 18 movable through the central hole in the work gear into a recess 20 provided in a master gear 22. The master gear 22 includes a shaft 24 rotatably supported in bearing means indicated at 26 carried by the frame 10.

It will be understood that the master gear 22 is of the same size and preferably has the same number of teeth as the work gear W.

Adjacent the work gear W and master gear 22 there is provided a hollow shaft 30. The shaft 30 is mounted in bearings 32, 34 in a carrier 36 which is supported on the frame 10 by a pivot mounting stud 38 in such a way as to permit the shaft 30 to move radially with respect to the axes of the work gear W and master gear 22. In the diagrammatic figure the shaft 30 is shown out of position and it will be understood that it will actually be located in the same horizontal plane as the axes of the work gear W and master gear 22.

A plurality of gear-like gauge elements are mounted on the shaft 30 as will now be described. Fixed to the shaft 30 is a first gear-like gauge element 40. Fixed to the shaft 30 and spaced from the gauge element 40 is a hub 42 having a radially extending flange 43. Intermediate the gauge element 40 and the hub 42 are relatively angularly movable gear-like gauge elements 44, 46, 48 and 50. Means are provided for keeping the teeth of the gauge elements 40, 44, 46, 48 and 50 in approximate alignment while permitting substantially free but very limited relative angular movement therebetween. This means comprises a plurality of reeds one of which is indicated at 52, and connects gauge element 40 to gauge element 46. The reeds 52 may conveniently be piano wire, an intermediate portion of which may be thinned down a few thousandths of an inch so as to oppose negligible resistance to limited angular movement. The reed 52 which connects gauge elements 40 and 46 extends through an opening 54 in the intermediate gauge element 44. A similar reed 56 interconnects gauge elements 40 and 44. Similarly, gauge element 48 is connected to the flange 43 by a reed 58 passing through an opening 60 in intermediate gauge element 50. Gauge element 50 in turn is connected to the flange 43 by a similar reed (not shown).

The gauge elements 44, 46, 48 and 50 are all supported for rotation on the shaft 30 by suitable bearing means such as needle bearings indicated at 62.

Gauge elements 44 and 46 constitute a first pair of gauge elements, and gauge elements 48 and 50 constitute a second pair of gauge elements. Gauge elements 44 and 46 are spring biased in opposite directions by suitable means such for example as springs 64 carried by arms 66 supported by the fixedly mounted gauge element 40. A similar biasing means includes an arm (not shown) extending through an opening in intermediate gauge element 44 and having a spring engageable with gauge element 46 in relation to bias it opposite to the direction of bias of the gauge element 44.

The pair of gauge elements 48 and 50 are likewise biased in opposite directions by suitable spring means (not shown) carried by the flange 43.

Means are provided for sensing relative angular displacement or the instantaneous angular position of the movable gauge elements 44, 46, 48 and 50. The sensing means associated with the gauge element 48 is shown in the figure and comprises an arm 70 fixedly connected to gauge element 48 and extending through openings formed in the gauge element 50 and the radial flange 43 of the hub 42. Carried by the right hand end of the arm 70, as seen in the figure, is the core element of a linear variable differential transformer 72. This is a standard article of commerce and is adapted to have an electrical output which varies in accordance with the position of the movable core. The device is very sensitive and is capable of measuring the position or movement of the gauge elements with great precision. A second sensitive transformer is indicated at 74 whose armature may be connected to gauge element 44 or 46.

The electrical output of the several sensitive transformers are connected by lines 76 to slip rings 78 associated with brushes 80 carried by a support 82 connected to the carrier 36.

Figure 14:
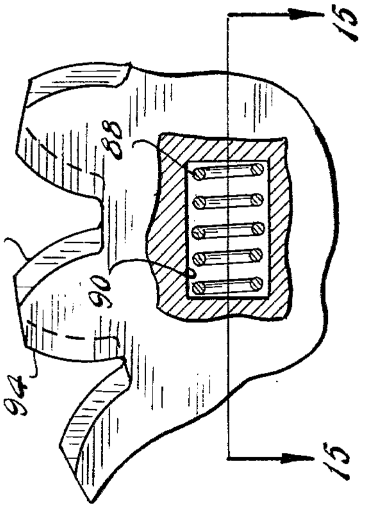
FIGURE 14 is a fragmentary view of a master gear and biasing spring.
Figure 15:
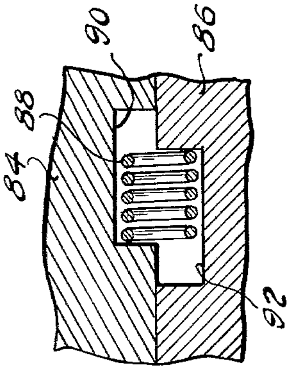
FIGURE 15 is a fragmentary sectional view on the line 15—15, FIGURE 14.

Mounted for angular movement on the shaft 30 are a pair of master gears 84 and 86. Master gears 84 and 86 have teeth which are somewhat thinner than the teeth of the master gear 22 so as to mesh therewith in loose mesh. Means are provided urging master gears 84 and 86 in opposite directions so as to take up backlash. This means comprises a spring 88 seen in FIGURE 1, and illustrated in detail in FIGURES 14 and 15. In these figures it will be observed that the spring 88 is received in a pocket formed by recesses 90 and 92 formed in the paired master gears 84 and 86. When the recesses 90 and 92 are in registration as suggested in FIGURE 14, the teeth 94 of the master gear 84 are substantially out of alignment with the teeth 96 of the master gear 86. The resulting composite tooth formed by tooth portions 94 and 96 is somewhat wider than the tooth space of the single master gear 22 so that when meshed, teeth 94 and 96 are spring biased into constant but yieldable engagement with the teeth of the single master gear 22. At this time the relationship is as illustrated in FIGURE 15 where it will be observed that the spring 88 is substantially compressed by relative angular movement between the paired master gears 84 and 86.

Figure 12:
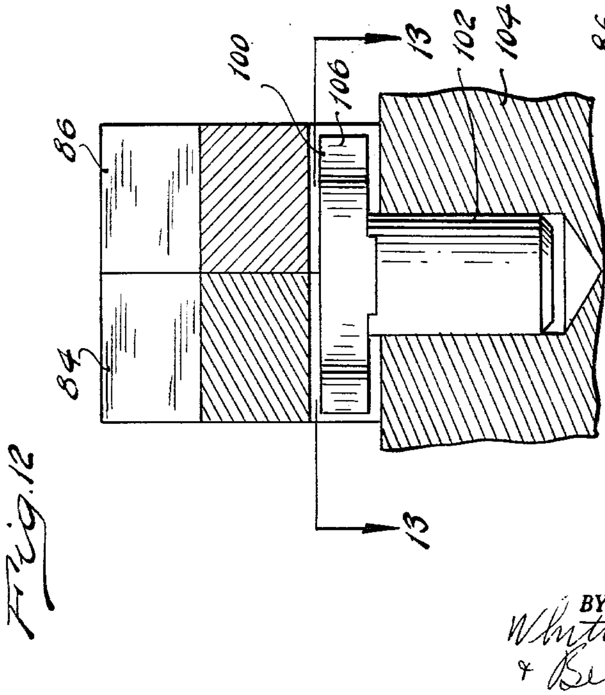
FIGURE 12 is a fragmentary sectional view of means connecting the pair of master gears.
Figure 13:
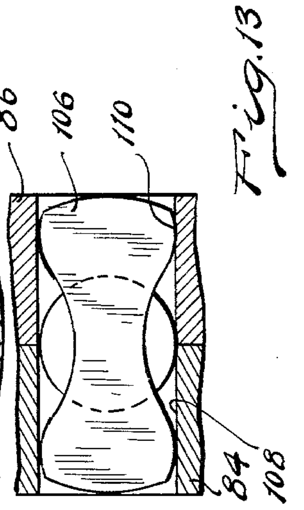
FIGURE 13 is a fragmentary sectional view on the line 13—13, FIGURE 12.

In addition, means are provided to insure that the paired master gear elements 84 and 86 are approximately centered so that each of the pairs of master gears may be movable in either direction. Without such an arrangement it might be possible for the paired master gear elements to be biased in one direction or the other by the act of loading a work gear onto the arbor 18 so that readings could not be taken of the movement of the paired master gears in both directions as is necessary. This means comprises a pivoted element 100 mounted for angular movement about a stem 102 extending radially of the shaft 30 in a fixed support ring 104. The element 100, as best illustrated in FIGURES 12 and 13, includes laterally extending arms 106 which are rounded and which are received in pockets 108 and 110 in master gears 84 and 86 respectively. As best seen in FIGURE 13, it will be observed that movement of the master gear 84 in either direction is accompanied by approximately equal and opposite rotation of the master gear 86. The ends of the arms 106 have a few thousandths' clearance with respect to the pockets 108 and 110 so that the operation is to keep the teeth of the pair of master gears 84 and 86 only approximately centered with respect to the corresponding tooth spaces of the single master gear 22.

As will subsquently be described, measurement of certain gear characteristics, such for example as size, pitch diameter, run-out, and nicks, is accomplished by observing displacement of the carrier 36, or more specifically, radial movement of the shaft 30 with respect to the work gear W and single master gear 22. For this purpose a sensitive measuring device, such for example as a linear variable differential transformer, is provided, the armature of which is connected to the movable carrier 36.

The gear-like gauge elements are substantially larger than the work gear so that a single rotation of the gauge elements results in a plurality of rotations of the work gear. In the illustrated embodiment of the invention the gauge elements have at least three times as many teeth as the work gear. Accordingly, the teeth of the gauge elements may be divided into three sections each of which is designed to perform a particular gear gauging operation. It is desirable, in analyzing the output of the sensitive transformers, to obtain a signal which indicates commencement of engagement with the work gear of a particular section of the teeth of the gauge elements. For this purpose the shaft 30 is provided with a cam or actuator 112 associated with a switch 114. If desired, so as to introduce no resistance to rotation of the shaft 30, the switch 114 may be a proximity switch which requires no actual contact with the actuator 112.

Reference is now made to FIGURES 2–8 for a detailed disclosure of the gear-like gauge elements and master gears.

Figure 2:
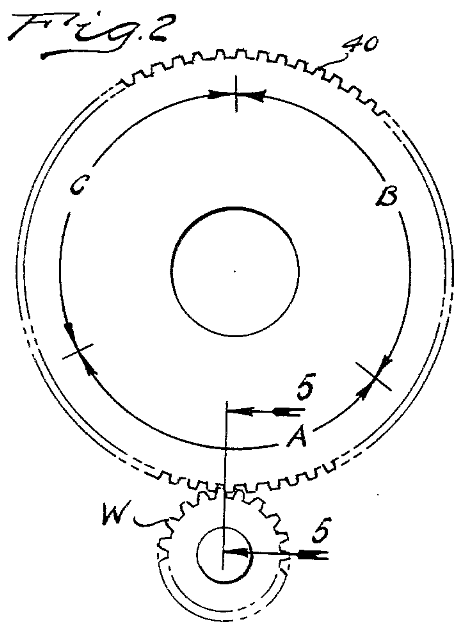
FIGURE 2 is an elevational view of a work gear in mesh with a gear-like gauge element fixed to a spindle.

FIGURE 2 shows the work gear W in mesh with a zone of the gauge element 40 designated as zone A. It will be appreciated that this zone of the gauge element contains at least as many teeth as the work gear so that the work gear will make at least one complete rotation while in mesh with the teeth of zone A of the gauge element.

Figure 3:
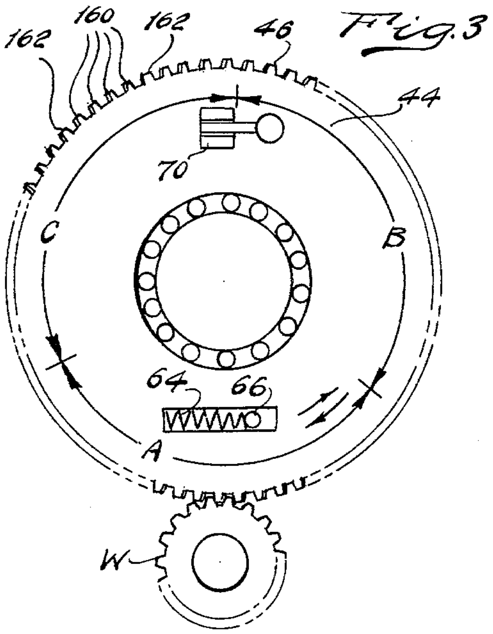
FIGURE 3 is an elevational view of a work gear in mesh with a pair of modified gear-like gauge elements mounted on the spindle for independent angular movement thereon.

Referring to FIGURE 3 there is shown the work gear W in mesh with zones A of the teeth of the pair of gauge elements 44 and 46. This figure includes a diagrammatic illustration of a linear variable differential transformer 70 and also spring biasing means including the spring 64 and arm 66.

Figure 4:
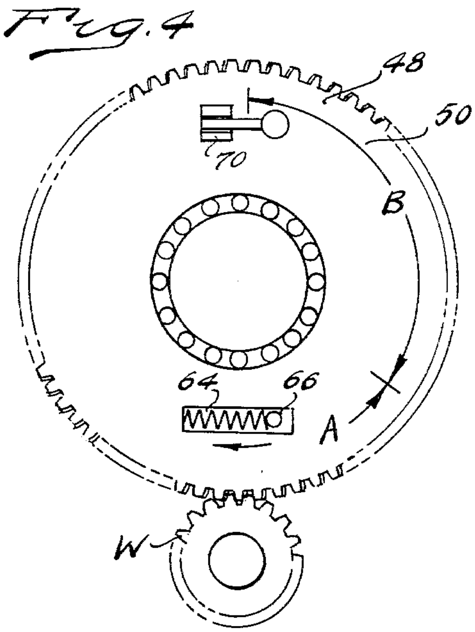
FIGURE 4 is an elevational view of the work gear in mesh with a second pair of modified gear-like gauge elements.

FIGURE 4 shows the work gear W in mesh with the pair of gear-like gauge elements 48 and 50 and also includes a diagrammatic illustration of the transformer 70 and spring biasing means including a spring 64.

Figure 8:
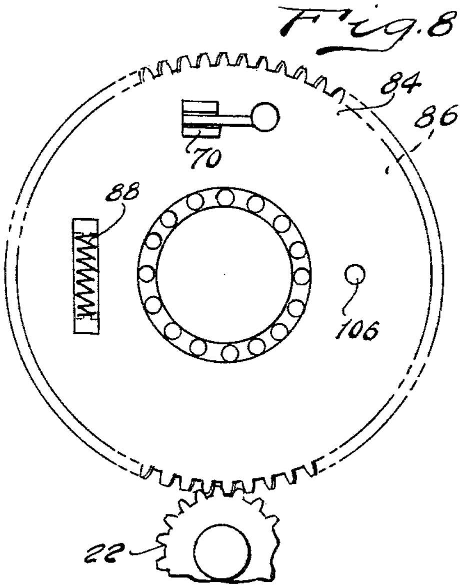
FIGURE 8 is an elevational view of a first master gear in mesh with a pair of relatively angularly movable master gears.

FIGURE 8 shows the master gear 22 in mesh with the pair of master gears 84 and 86. This figure also includes a diagrammatic showing of the sensitive transformer 70, the centering means including the arms 106, and the biasing spring 88.

Figure 5:
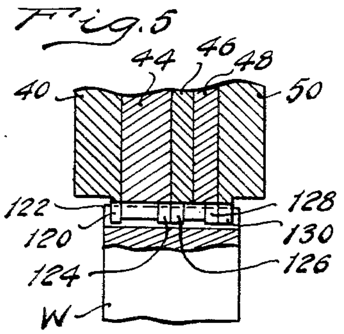
FIGURE 5 is a fragmentary section on the line 5—5, FIGURE 2.
Figure 9:
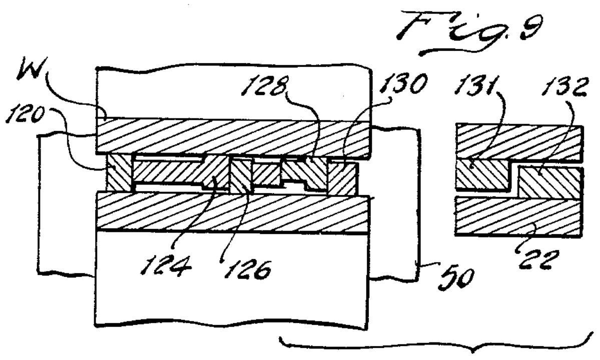
FIGURE 9 is a diagrammatic view showing the relationship between toothed portions of the several gear-like gauge elements at one zone thereof and a work gear.

Referring now to FIGURES 5 and 9 there is shown the shape of the engaging tooth portions of the gauge elements 44, 46, 48 and 50. FIGURE 5 is a section through parts of the gauge elements located in zone A. In this zone it will be observed that the gauge element 40 has relatively narrow teeth 120 which it will be observed are located adjacent the ends of the teeth 122 of the work gear. Gauge element 44 has relatively narrow teeth 124 located at one side thereof, and gauge element 46 has relatively narrow teeth 126 located at the opposite side thereof. Accordingly, the relatively narrow teeth 124 and 126 are directly adjacent to each other. Moreover, it will be observed that these relatively narrow teeth 124 and 126 are located substantially centrally of the teeth 122 of the work gear W. Gauge element 48 has relatively narrow teeth 128 at one side thereof, and gauge element 50 has relatively narrow teeth 130 at the opposite side thereof. Accordingly, the relatively narrow teeth 128 and 130 are directly adjacent each other. Moreover, it will be observed that these relatively narrow teeth are located closely adjacent to the end of the teeth 122 of the work gear opposite to the end thereof engaged by the relatively narrow teeth 120 of the gauge element 40.

It will of course be understood that the present gauge may be designed for use with spur gears or helical gears. The simplest case is of course spur gears because the permits all of the teeth of the several gauge elements to be axially aligned. However, in the case of helical gears, the gear-like gauge elements are also made with helical teeth of opposite hand to the work gear. In FIGURE 9 there is diagrammatically illustrated the spur tooth portions 120, 124, 126, 128 and 130 as in mesh with spur tooth spaces of the work gear W. For most checks it is unnecessary that the tooth portions of the several gauge elements have any normal or reference angular relationship with each other. In FIGURE 9, which is representative of the meshed relationship between teeth in zone A, it will be observed that the tooth portion 120 is indicated as in tight mesh with the tooth space of the work gear. On the other hand, teeth 124 and 126 are in loose mesh but are spring biased into contact with opposite sides of the toothh spacing of the work gear. The same is true of the teeth 128 and 130. In this figure at the right are indicated teeth 131 and 132 of the paired master gears 84 and 86, which are shown as in backlash with respect to the tooth space of the single master gear 22 but spring biased into contact with opposite sides of the tooth space.

Figure 6:
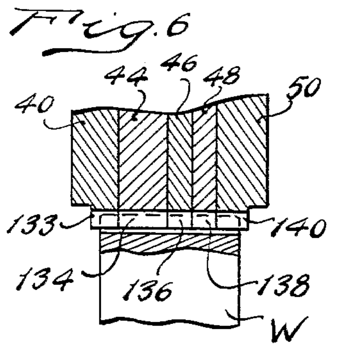
FIGURES 6 and 7 are fragmentary sectional views similar to FIGURE 5, showing engagement of the work gear with different peripheral zones of the gauge elements.
Figure 10:
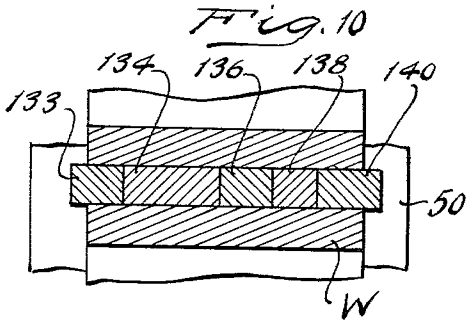
FIGURES 10 and 11 are views similar to FIGURE 9 showing the corresponding relationship between different zones of the gear-like gauge elements.

Referring now to FIGURES 6 and 10 there is illustrated the meshing relationship and shape of the teeth of the gauge elements in zone B. As seen in FIGURE 6, the gauge element 40 has in zone B, teeth 133 somewhat wider than the teeth 120 of its zone A. The teeth 133 are of a width sufficient to extend outwardly beyond the adjacent end of the teeth 120 of the work gear W. In this zone gauge elements 44, 46 and 48 have teeth 134, 136 and 138 whose length is equal to the face width of the gauge elements 44, 46 and 48. Similarly, gauge element 50 has teeth 140 somewhat wider than the teeth 130 in its zone A. The teeth 140 as seen in FIGURE 6, extend outwardly beyond the adjacent end of the teeth 120 of the work gear W.

As best seen in FIGURE 10, which represents the meshing relationship of the teeth of the several gauging elements in zone B, it will be observed that the teeth 133, 134, 136, 138 and 140 are all of the same thickness and are accordingly all in tight mesh with the work gear and therefore in simultaneous contact with opposite sides of the tooth spaces therein.

Figure 7:
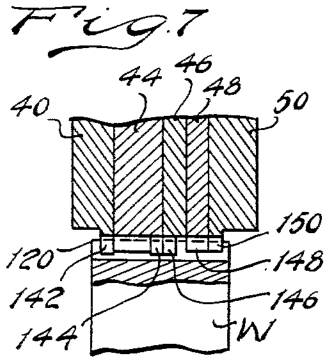
Figure 11:
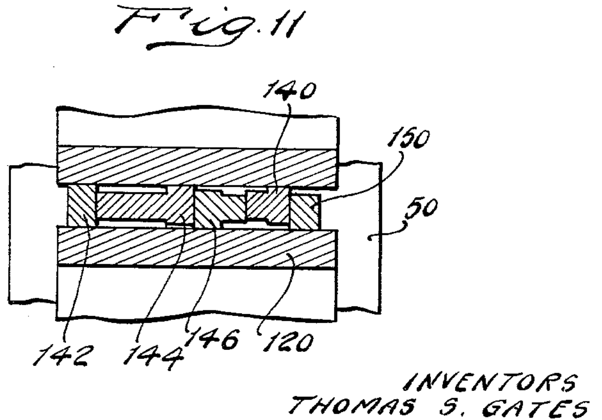

Referring now to FIGURES 7 and 11 there is illustrated the relationship and shape of the teeth in zone C of the gauge elements. In this zone the gauge element 40 has teeth 142 which are relatively narrow and which are adapted to engage the teeth 120 of the work gear W close to the end thereof. Gauge elements 44 and 46 have teeth 144 and 146 respectively which are relatively narrow and are at the adjacent sides of the gauge elements. The teeth 144 and 146 are positioned to contact the teeth 120 of the work gear substantially intermediate the ends thereof.

Gauge elements 48 and 50 have teeth 148 and 150 respectively which in this section of the gauge elements have no function. These teeth may be relieved or not, but in any case are not allowed to influence the movement of the other gauge elements.

Referring to FIGURE 11 it will be observed that the teeth 142 are in tight mesh with the work gear, while teeth 144 and 146 are in loose mesh and are spring biased into engagement with opposite sides of the tooth spaces. At all times the teeth 131 and 132 of the paired master gears 84 and 86 are in loose mesh with the single master gear 22 and are spring biased into contact with opposite sides of the tooth spaces thereof as seen in FIGURE 9.

*Lead, crown and spacing check*

The gear is checked for lead, tooth crown, and spacing between its teeth, both tooth-to-tooth and accumulative, by a single rotation of the work gear in mesh with the teeth in zone A of the gear-like gauge elements. Rotation is imparted to the gear-like gauge elements and to the paired master gears 84 and 86 by the motor driven rotation of the work gear W and the master gear 22. Angular displacement between gauge element 40 and gauge element 50 will depend upon the lead of the tooth surface of the work gear in contact with the teeth 120 and 130 which engage opposite end portions of work gear teeth. This angular displacement is of course sensed by the sensitive transformer whose armature is connected to the gauge element 50. Inasmuch as the gauge element 40 is fixed to the shaft 30, a measurement of the actual displacement of the gauge element 50 from its predicted position will afford a measurement of any error in lead or helix angle.

It will of course be understood that the lead of the opposite sides of the work gear teeth is determined by a similar displacement of the teeth 128 of the gauge element 48. It will also be apparent of course that a departure between leads at opposite sides of the gear teeth represents a taper in the teeth.

The present gauge is designed for gauging work gears having crowned teeth. As is well understood in the art, crowned teeth are teeth which are longitudinally convex; that is, convex from end to end thereof. It is for this reason that the gauge teeth 120 and 130 are relatively narrow.

The actual amount of crown provided on the teeth of the work gear is also determined by the teeth in zone A of the gauge elements. For this measurement displacement of the teeth 124 and 126 of the intermediate gauge elements 44 and 46 is determined. Thus for example, if the teeth of the work gear have no crown and no lead or helix angle error, then the teeth 120, 124 and 128 will all be in true alignment. If however, there is provided a crown on the teeth of the work gear, this will result in a relative displacement of the teeth 124 out of alignment with the teeth 120 and 128. The amount of such displacement is of course an indication of the amount of crown.

A measurement of the tooth spacing is afforded by comparing the positions or measuring the relative angular displacement between gauge element 44 or 46 and the paired master gears 84 and 86.

The presence of a tooth spacing error will result in rotational displacement of the gauge element 40 which is fixed to the shaft 30. This will presumably not result in any relative displacement between the gauge elements 40 and 46. However, it is desirable to measure tooth spacing error if any, at the center of the teeth of the work gear. Accordingly, any displacement between gauge elements 40 and 46 is measured. The actual measurement of the amount of spacing error is determined by displacement of one of the master gears 84 and 86. Angular displacement of the last mentioned master gear is measured relative to the shaft 30 and hence, relative to the gauge element 40 which is fixed to the shaft. This gives an indication of tooth spacing error present at the end of the teeth of the work gear. This measurement is corrected by the amount of displacement between the gauge elements 40 and 46, if any, which results in producing a measurement of tooth spacing error at the center of the teeth of the work gear.

It is contemplated that the output of the linear variable differential transformers will be fed to suitable analytical computers which will be able to compute tooth-to-tooth spacing and will be able to record and add a plurality of values of tooth spacing so as to produce a reading or indication of total accumulated spacing error.

*Eccentricity, size and nicks*

The zone B of the several gear-like gauge elements is employed in the determination of eccentricity or pitch diameter run-out, size and nicks. For this purpose it is essential to provide tooth portions in zone B on all of the gauge elements which cover as far as possible all of the surface of all of the teeth of the following gear, and if the work gear is crowned, the teeth of the gauge elements are longitudinally concave, or "inverse crowned." In this section accordingly, the teeth 132, 134, 136, 138 and 140 are widened out so that together they cover the entire surface of the work gear, except for the very negligible clearance existing between the several gauge elements.

Moreover, the measurements made at this time are determined by center distance reaction. In other words, if any of the errors referred to exist, the carrier 36 is caused to swing about its pivot mounting 38 to move the gauge elements carried by the shaft 30 substantially radially away from the axis of the work gear. It will of course be obvious that an oversize work gear displaces the carrier 36 outwardly beyond its predicted position, and the amount of such displacement is of course a measurement of size. Moreover, as the work gear goes through a complete revolution, a gradual increase followed by a decrease in center distance is an indication of eccentricity or pitch diameter run-out and the amount of such error is of course directly related to the displacement.

Finally, if a nick or protuberance is present on the working surface of any tooth of the work gear, this nick or protuberance will be effective to displace the gauge element contacting such nick or protuberance radially outwardly. This displacement of the carrier will of course be of short duration and will be readily identifiable as resulting from a nick or other protuberance.

*Involute*

The present gauge also includes a zone C of the gauge elements designed for the purpose of obtaining a measurement of the involute forms of some of the teeth of the work gear. During this measurement the position of the carrier 36 is determined by engagement between tightly meshed teeth of gauge member 40 and the work gear, all other gauge members being in loose mesh with the teeth of the work gear.

The gauge illustrated herein is designed to measure the involute of four teeth at substantially 90 degrees' intervals on the work gear. This is accomplished by a relatively slow traverse of a single tooth of a gauge element through a tooth space of the gear during which time relative angular movement between the single gauge element and a corresponding one of the pair of master gears 84, 86 is obtained. Of course, the involute at opposite sides of a single tooth space of the work gear may be measured simultaneously by observing relative displacement between both of the gauge elements 44 and 46 with the corresponding ones of the pairs of master gears 84 and 86.

The present invention is intended to provide a quick analytical check of gears in a high production operation and accordingly, all of the rotations of the parts previously described are carried out at the maximum possible speed consistent with the accuracy required. However, for obtaining an accurate involute measurement, it is necessary that the traverse of the single tooth of the gauge element through a tooth space of the gear takes place relatively slowly. Accordingly, means are provided for effecting a relatively slower rotation of the work gear during its measured engagement with the teeth in zone C of the gauge elements.

In order to obtain a true indication of the involute action between the teeth of the work gear and the teeth of a gauge element, it is essential to insure that only a single tooth of the gauge element is in contact with the work gear. Accordingly, in zone C the gauge elements 44 and 46 include series of relatively thin teeth 160 followed by a tooth 162 which is substantially thicker than the teeth 160. As shown in FIGURE 3, the relatively thick teeth 162 are separated by four of the relatively thin teeth 160.

It will be recalled that the gauge elements 44 and 46 are spring biased in opposite directions so that when the relatively thin teeth 160 occupy tooth spaces of a gear, gauge elements 44 and 46 will rotate relative to each other to a maximum extent as permitted by stop means. This stop means may be specially provided or it may be simply afforded by the reeds 52, 56, 60, previously described. In any case, as the relatively thicker teeth 160 move into engagement with the work gear, a very substantial relative rotation is imparted to the gauge elements 44 and 46. This substantial and abrupt relative rotation between gauge elements 44 and 46 produces a quick change in the output of the differential transformers associated therewith and this is used as a signal to indicate the approach of means for checking the involute of a tooth on the work gear.

The actual measurement of the involute may be by a comparison of relative displacement between one of the gears 48 or 50 and the corresponding one of the pair of master gears 84 and 86. It is preferred however, to obtain a measurement of involute action as a function of time. That is to say, while the measurement is of relative displacement, analysis is made as a function of time. This is because the involute check is to determine if the tooth form from a known point identified as the beginning of the true involute form, departs from this form at a rate greater than a predetermined maximum rate. The gauge is further designed to insure that the departure from the known involute form is within limits from the beginning of the true involute form to an intermediate point adjacent to but spaced substantially below the crest of the gear tooth. Thus, when the comparison of positions or the relative displacement between the gauge element 44 or 46 and the master gear 84 or 86 is commenced, this measurement is continued for a known interval of time sufficient to cause the shifting of contact on the tooth of the gear from the commencement of true involute profile to a narrow zone adjacent but spaced inwardly from the crest of the tooth. It is thus seen that the measurement of involute takes place throughout a very brief but accurately timed interval which commences a set interval after the signal resulting from the abrupt relative movement between the gauge elements 44 and 46 occasioned by initial contact between one of these elements and the work gear.

In actual practice, the production of gears will include the checking of all gears by passing them through the gauge. Actual time of checking is very short, normally about 15–20 seconds. Accordingly, the gauge will normally be provided with automatic loading mechanism so that a completed gear is released from the gauge by withdrawing the expanding arbor 18 and permitting the gauged gear to pass along a discharge chute where it will be classified in accordance with its gauged characteristics in a manner known to the art. Automatic loading mechanism may advance a second work gear into position to be picked up by the arbor 18 as it is next advanced. The work gears W require to be meshed simultaneously with the driving gear 14 and with the gear-like gauge elements 40, 44, 46, 48 and 50. As the work gear is picked up its teeth will of course be in mesh with the teeth of the gear-like gauge elements. At the same time the paired master gears 84 and 86 will be in a relation such that the teeth thereof are equally displaced from an aligned position, due to the action of the equalizer including the arms 106.

Referring now to FIGURES 16–19 there is included a diagrammatic illustration of mechanism embodying the operating characteristics of the invention.

Figures 16, 17, 18, 19:
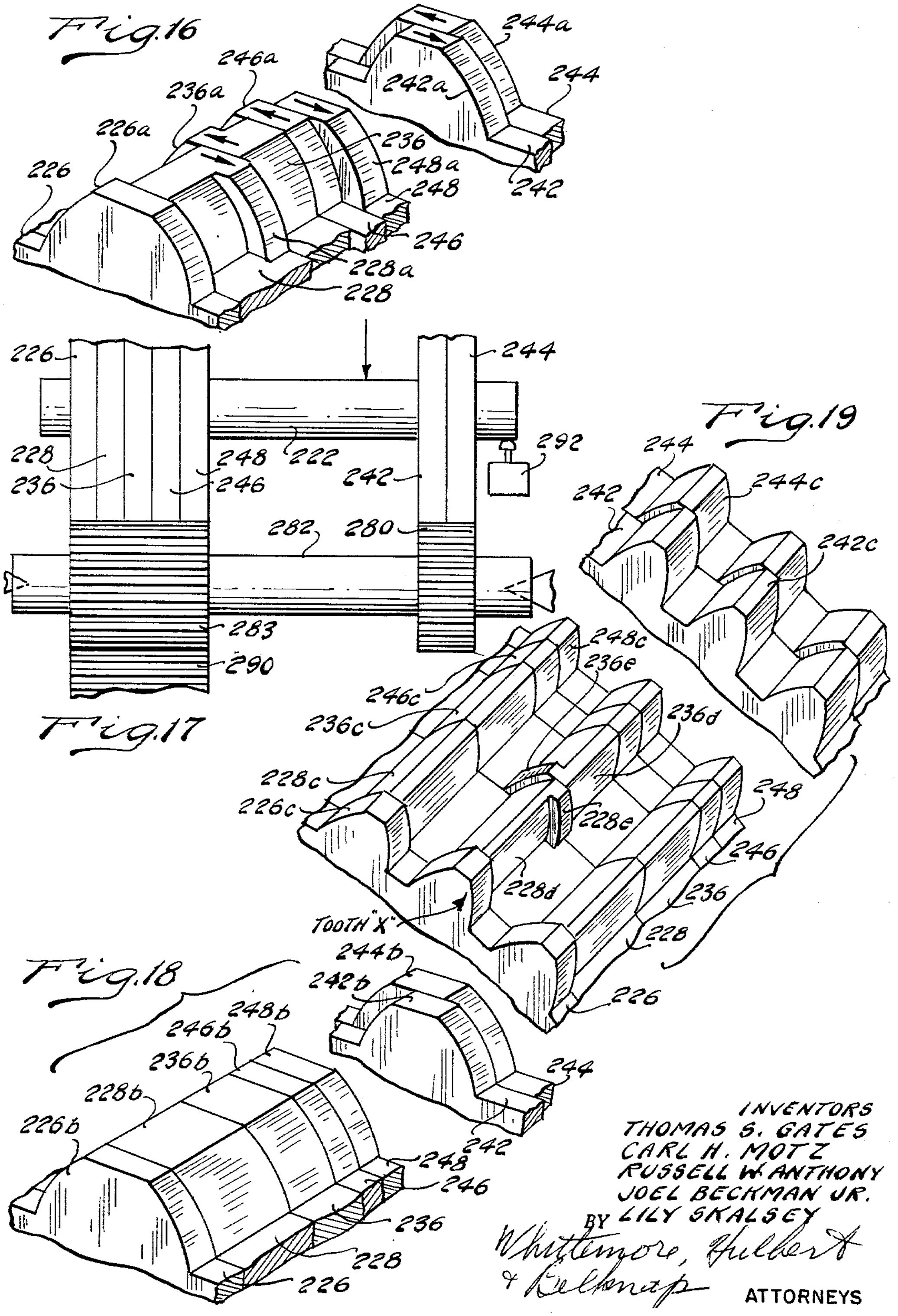
FIGURE 16 is a fragmentary perspective view of tooth sections of a diagrammatically illustrated embodiment of the invention.
FIGURE 17 is a digrammatic view showing the intermeshing relationship between the several gear elements.
FIGURE 18 is a fragmentary perspective view similar to FIGURE 16, showing a different section of the gauge elements.
FIGURE 19 is a fragmentary perspective view showing the relationship between tooth portions in a different section of the gauge elements.

As best seen in FIGURES 16 and 17, there is shown the shaft 222 on which are mounted gauge elements 226, 228, 236, 246 and 248, as well as the interconnected motion transmitting gears 242 and 244. These latter gears are in mesh with the master gear 280 fixed to the arbor 282 carrying the work gear 283 which in turn is driven by the drive gear 290. The gauge element 226 is provided with relatively thin uniform involute teeth **226*a*. These teeth are of standard tooth thickness, or in other words, of a proper thickness to be conjugate to the teeth of a work gear. Gauge element 228 has teeth which are relieved so as to leave only the relatively narrow involute bearing portion 228*a*. Similarly, gauge element 236 has teeth relieved to leave only relatively narrow involute bearing portions 236*a*. It will be noted that in assembly the bearing portions 228*a* and 236*a* are adjacent each other and are separated from the adjacent gauge elements. Gauge elements 246 and 248 have relatively narrow directly adjacent tooth portions 246*a* and 248*a*. These tooth portions are of less than standard thickness as compared to teeth 226*a***.

Master gears 242 and 244 have relatively narrow tooth portions **242*a* and 244*a* which are relatively adjacent to each other and are adapted to be received in tooth spaces in the master gear 280**.

Gauge element 226 is fixed to the shaft 222. Gauge elements 228 and 236 are mounted on the shaft 222 for limited rotation and are spring loaded in the direction shown by the arrow in FIGURE 16. These teeth are relieved all along one profile and are partly relieved along the other profile to leave a narrow contact band as shown. Gauge elements 246 and 248 are mounted on the shaft for limited rotation thereon and are spring loaded in the direction shown by the arrows in FIGURE 16. As previously stated, these teeth are relatively narrow.

Masters gears 242 and 244 are mounted on the shaft 222 for limited rotation and are spring loaded in the direction shown by the arrows in FIGURE 16. In addition, they are interconnected but are provided with backlash and can rotate independently about the shaft 222. As illustrated, the teeth are relatively narrow.

The shaft 222 is spring loaded toward the arbor 282, as indicated by the arrow in FIGURE 17, but is free to move so as to increase or decrease the center distance between it and the arbor 282.

The master gear 280 is fixed to the arbor 282 and is a reference gear similar to the work gears 283 to be tested. The work gear 283 is fixedly mounted on the arbor 282.

Sensing devices as previously described are attached to the gears 228, 236, 246, 248 and 242 to measure their rotational displacement relative to the shaft 222. Gauge elements or gears 226, 228, 236, 246, 248, 242 and 244 each contain three sections, each section having a number of teeth at least equal to the number of teeth in the work gear.

All checks to be made with the sections of the gauge elements and gears having the tooth forms shown in FIGURE 16 are made with the work and the gear 226 in tight mesh. The master gear 280 and interconnected gears 242 and 244 will also be in spread gear tight mesh. Gears 228, 236, 246 and 248, due to their spring loading, will contact the work gear tooth profiles or the master gear tooth profile. If the work gear is helical the contacts may be on several tooth profiles, not necessarily on the same tooth, and also at different points on the profile.

Lead of the work gear will be checked individually on both sides of all teeth. The work gear may be checked both green and hard. The average lead and individual variations in lead will be checked. Gear gauge elements 226, 246, and 248 are used for this check. Gear gauge element 226 is the reference master and the relative rotation of gear 248 or 246 from the normal position relative to gear 226 will indicate the lead error.

Crown will be checked individually on both sides of all teeth at the center of the tooth face width only. It may be checked green and hard. Both average and variation will be checked. Gauge gears 226, 228 and 236 are used for this check. Gears 246 and 248 are also used but only to assist in the electronic computation. The relative rotation of gears 228 or 236 from the line established by the teeth of gear gauge element 226, 246 or 248 furnish the crown reading. Thus, for example, if contact on the teeth of elements 226, 228 and 248 are in alignment, the corresponding side of the work gear teeth contacting these elements is uncrowned.

Tooth-to-tooth spacing is checked individually on both sides of all teeth and may be checked both with the work gear green and hard. Gear gauge elements 226, 228, 236, 242 and 244 are used for this check. Again, gear gauge element 226 is used as reference and the deviation of gear 228 or 236 from their normal positions relative to gear 226 is observed. Similarly, the deviation of gear 244 relative to gear 226 is observed. The spacing error is the algebraic difference between the two readings.

Angular velocity is determined by noting the spacing errors of one tooth relative to any other and observing this spacing error electronically until a maximum displacement is observed. This is the angular velocity error.

It should be noted that lead and crown checks are made at timed increments equivalent to one observation per tooth of the work gear. The tooth-to-tooth spacing will also be checked at these timed intervals either by a rate or deviation check.

Referring now to FIGURE 18 there is illustrated fragmentary portions of the gauge elements and gears 226, 228, 236, 246, 248, 242 and 244. In this section teeth *226b*, *242b* and *244b* are exactly the same as teeth 226a, *242a* and *244a*. Teeth *228b* are unrelieved and hence are of the same standard tooth thickness as the teeth *226a* and *226b*. Teeth *236b* are also unrelieved and hence are of the same standard tooth thickness. Teeth *246b* and *248b* are the same as teeth *246a* and *248a*, except that they are not relieved and hence are of the same standard thickness as teeth *226b*.

In using this section of the gauging elements, a sensing device is attached to the shaft 222 such for example as indicated diagrammatically at 292, to measure the variation in center distance between shaft 222 and arbor 282.

The teeth *226b*, *228b*, *236b*, *246b* and *248b* are ground in stacked relation with a longitudinal concavity or "inverse crown," so as to be conjugate to the crowned tooth of a work gear.

When employing the sections of the gear gauge elements illustrated in FIGURE 18, all checks will be made with the work gears 228 and 236 in cramped tight mesh. Master gear 280 and interconnected master gears 242 and 244 will be in spread gear tight mesh. The work gear and gears 246, 248 and 226 may or may not be in cramped tight mesh depending on the work gear crown conditions.

With the portion of the gauge elements illustrated in FIGURE 18, size is checked on all teeth and may be checked both green and hard. Size will be classified into five ranges: Undersize, oversize, and three graduations all of which are within the acceptable size range. The center distance reaction between shaft 222 and arbor 282 will be used to read size. This is a continuous reading for one revolution of the work gear.

Pitch diameter run-out will be checked on all teeth of the work gear and may be checked both green and hard. It consists of tooth-to-tooth, total and "X" tooth variation where "X" is the number of teeth in a one-quarter revolution of the work gear. The center distance reaction between shaft 222 and arbor 282 is used for these readings. These are rate change readings of timed increments equivalent to one observation per tooth of the work gear.

Nicks will be checked on hard gears only. This is a continuous check made by observing center distance reaction for one work revolution. Any significant rate change pulsations will read as nicks.

Referring now to the structure illustrated in FIGURE 19, teeth *226c* are full teeth of standard thickness, identical with the teeth *226a* and *226b*. Teeth *242c* and *244c* are identical with teeth *242a* and *242b* and *244a* and *244b*, respectively. Gear gauge elements 246 and 248 can rotate a limited amount about shaft 22, as previously described, and are spring loaded in the direction shown by the arrows. The teeth *246c* and *248c* thereof are reduced in thickness by an amount such as to prevent them from reaching standard tooth thickness when they are at the end of their limited amount of travel. Gear gauge elements 228 and 236 are made and operate just like the elements 246 and 248 in this section with the exception of four teeth designated "X" in FIGURE 19. These teeth, designated *228d* and *236d*, differ from the remaining teeth *228c* and *236c* in that they are relieved all along one profile and partially relieved along the other profile to leave the narrow contact bands *228e* and *236e*. These four aligned tooth sections, constituting the tooth "X" are spaced in such a manner that when the work and the gauge gear assembly mounted on the shaft 222 are rotated together, they will contact the work at four points spaced 90 degrees apart. Sensing devices are attached to the gears 228, 236 and 242 to measure their rotational displacements relative to the shaft 222.

All checks made with the sections of the gear gauge elements illustrated in FIGURE 19 will be made with the work piece and the gear 226 in cramped tight mesh. Master gear 280 and interconnected master gears 242 and 244 will also be in spread gear tight mesh. The teeth *246c* and *248c* will never contact the work gear profiles, being of less than standard tooth thickness and having motion limiting means of the type shown in FIGURES 14 and 15.

Only the four specially modified teeth *228e* and *236e* of elements 228 and 236 respectively, will contact the work gear tooth profiles. The thin teeth *228c* and *236c* will enable the equipment to define the start of contact with the four special teeth.

Involute variation will be checked individually on both sides of four tooth spaces by the four specifically modified teeth *228d* and *236d*. It will be checked both green and hard. Gear elements 226, 228, 236, 242 and 244 are used for this check. The gear 226 is used as a reference and the deviation of the gear gauge elements 228 or 236 from their normal positions relative to the gear 226 is observed. Similarly, the deviation of the gear element 242 relative to gear 226 is observed and an algebraic difference between these two readings is determined. The involute is checked in two different ways. One of these is a rate check and the other is an increment check. The rate check monitors the involute errors, and the increment check monitors the involute modification at strategic points. The four teeth are checked individually and also checked against each other.

The involute average is obtained by an electronic average of the involute errors at the modification points.

The drawings and the foregoing specification constitute a description of the improved single station multimaster gear gauge in such full, clear, concise and exact terms as to enable any person skilled in the art to practice the invention, the scope of which is indicated by the appended claims.

What we claim as our invention is:

1. Gear gauging apparatus comprising a rotary gear support for a work gear, a rotary gauge support, a first gear-like gauge member on said gauge support and fixed thereto, a pair of gear-like gauge members rotatable on said gauge support, resilient means biasing each of said pair of members in opposite directions, the teeth on said first member engaging one end of the teeth of a work gear, the teeth of said pair of gauge members engaging the other end portion of the teeth of a work gear at opposite sides thereof, means for rotating the work gear and all of said gauge members in meshed relation, and means for measuring circumferential displacement between said first gauge member and each of said pair of gauge members to determine lead at both sides of the teeth of the work gear.

2. Gear gauging apparatus comprising a rotary work support, a rotary gauge support having its axis parallel to the axis of said work support, a plurality of relatively rotatable gear-like gauge members on said gauge support adapted to be placed in mesh simultaneously with a work gear for meshed rotation therewith, the teeth of one of said gauge members being dimensioned to mesh tightly with the teeth of a work gear, the teeth of another of said gauge members being dimensioned to be in loose mesh with the teeth of the work gear, means for biasing said other member circumferentially, and means for measuring relative circumferential displacement between said members as a function of lead of the teeth of the work gear during continuous rotation of said support.

3. Gear gauging apparatus comprising a rotary work support, a rotary gauge support having its axis parallel to the axis of said work support, a first gear-like gauge member fixed to said gauge support, a pair of gear-like gauge members independently rotatable on said gauge support, means biasing said pair of members independently circumferentially on said gauge support, means for placing all of said members in mesh simultaneously with a work gear with the axes of said gear and members parallel, and means for measuring the relative helical alignment of the teeth of said members as a function of crown of the gear teeth during continuous rotation of said supports.

4. A gear gauge comprising a rotary shaft, a first gear-like gauge member fixed to said shaft, a second gear-like gauge member rotatable on said shaft, and an axially extending flexible reed connecting said fixed member to said rotatable member for rotation therewith and for limited rotation relative thereto.

5. A gear gauge comprising a rotary shaft, a first gear-like gauge member fixed to said shaft, second and third gear-like gauge members rotatable on said shaft, and axially extending flexible reeds connecting said fixed member to each of said second and third members.

6. Gauging apparatus comprising a first rotary support, a first master gear fixed to said support, means for fixing a work gear to said support, a second rotary support, a first gear-like gauge member fixed to said second support in position to mesh with the work gear, at least one additional gear-like member rotatable on said second support and in mesh with the work gear, and a second master gear rotatable on said second support in mesh with said first master gear, and means for measuring circumferential movement of said additional member and said second master gear on said second support.

7. Gauging apparatus comprising a first rotary support, a first master gear fixed to said support, means for fixing a work gear to said support, a second rotary support, a first gear-like gauge member fixed to said second support in position to mesh with the work gear, at least one additional gear-like gauge member rotatable on said second support and in mesh with the work gear, a second master gear rotatable on said second support in mesh with said first master gear, means for biasing said additional member and said second master gear in the same direction on said second support, and means for measuring circumferential movement of said additional member and said second master gear on said second support.

8. Gauging apparatus comprising a first rotary support, a first master gear fixed to said support, means for fixing a work gear to said support, a second rotary support, a first gear-like gauge member fixed to said second support in position to mesh with the work gear, a pair of gear-like gauge members rotatable on said second support and in mesh with the work gear, a pair of master gears independently rotatable on said second support in mesh with said first master gear, and means for measuring circumferential movement of corresponding ones of said pairs of members and master gears.

9. Gauging apparatus comprising a first rotary support, a first master gear fixed to said support, means for fixing a work gear to said support, a second rotary support, a first gear-like gauge member fixed to said second support in position to mesh with the work gear, a pair of gear-like gauge members rotatable on said second support in mesh with the work gear, means for biasing each of said pair of members circumferentially on said second support in opposite directions, a pair of master gears independently rotatable on said second support in mesh with said first master gear, means for biasing each of said pair of master gears circumferentially in opposite directions, and means for measuring circumferential movement of corresponding ones of said pairs of members and master gears.

10. Tooth form gauging apparatus comprising a rotary support, a gear-like gauge member rotatable thereon, means for biasing said member circumferentially on said support, checking teeth on said member, said checking teeth being separated from each other by a plurality of teeth of relatively reduced chordal thickness compared to the checking teeth to prevent interference while checking for tooth profile.

11. Tooth form gauging apparatus comprising a gauge shaft, a first gear-like gauge member fixed to said shaft, a second gear-like gauge member rotatable on said shaft, a master gear rotatable on said shaft, resilient means biasing said second member and master gear circumferentially in the same direction, a rotatable work shaft parallel to said gauge shaft, means for supporting a work gear fixed on said work shaft in mesh with said gauge members, a master gear fixed on said work shaft in mesh with said first mentioned master gear, and means for measuring circumferential displacement of said second member and first mentioned master gear.

12. Tooth form gauging apparatus comprising a gauge shaft, a first gear-like gauge member fixed to said shaft, a master gear rotatable on said shaft, resilient means biasing said master gear circumferentially on said shaft, a rotatable work shaft parallel to said gauge shaft, means for supporting a work gear fixed on said work shaft in mesh with said gauge member, a master gear fixed on said work shaft in mesh with said first mentioned master gear, and means for measuring circumferential displacement of said first mentioned master gear.

13. A gear gauge comprising a frame, a first spindle on said frame, means on said spindle for mounting a work gear in fixed relation, a first master gear fixed to said first spindle, a carrier, a second spindle on said carrier, means mounting said carrier on said frame for rocking movement about an axis positioned to permit movement of said second spindle substantially toward and away from said first spindle, a first gear-like gauge element fixed on said second spindle in mesh with said work gear, a second mster gear circumferentially movable on said second spindle and in mesh with said first master gear, means for measuring the position of said second master gear on said second shaft, and means for measuring the position of said carrier on said frame.

14. In gauge apparatus, a master gear assembly comprising a first shaft, a first master gear fixed on said shaft, a second shaft parallel to said first shaft, a pair of indepently rotatable master gears on said second shaft in mesh with said first master gear, resilient means acting solely between said pair of master gears urging them in opposite directions toward a predetermined position in which teeth are out of alignment by an amount sufficient to require displacement thereof to enter into mesh with the first master gear, and equalizer means connecting each of said pair of master gears to said second shaft and to each other to provide substantially equal and opposite circumferential displacement of the master gears of said pair.

15. In gauge apparatus, a master gear assembly comprising a first shaft, a first master gear fixed on said shaft, a second shaft parallel to said first shaft, a pair of indepently rotatable master gears on said second shaft in mesh with said first master gear, resilient means acting solely between said pair of master gears urging them in opposite directions toward a predetermined position in which teeth are out of alignment by an amount sufficient to require displacement thereof to enter into mesh with the first master gear, and equalizer means connecting each of said pair of master gears to said second shaft and to each other to provide substantially equal and opposite circumferential displacement of the master gears of said pair, said equalizer means comprising a pivot pin extending radially of said second shaft, and arms extending radially of said pin and engaged with portions of each of said pair of master gears.

16. A composite gear checker comprising a frame, a rotary work spindle, a rotary gauge spindle, means mounting one of said spindles on said frame for rotation in a fixed position, means mounting the other of said spindles on said frame for movement only generally radially of the axis of rotation of said one spindle, gauge gears on said gauge spindle comprising a first gauge gear fixed thereto and second and third gauge gears independently rotatable on said gauge spindle, all of said gauge gears being dimensioned for meshing simultaneously with a single work gear, driving means for driving one of said spindles in rotation, and means for measuring relative angular displacement between at least some of said gauge gears.

17. Apparatus as defined in claim 16 in which the driving means comprises a gear positioned to mesh with a work gear on said work spindle.

18. Apparatus as defined in claim 16 comprising yieldable means interconnecting said first gauge gear to said second and third gauge gears to maintain the teeth thereof in approximate alignment.

19. Apparatus as defined in claim 16 comprising resilient means acting solely between said second and third gauge gears to urge them in opposite directions of rotation.

20. Apparatus as defined in claim 18 comprising resilient means acting solely between said second and third gauge gears to urge them in opposite directions of rotation.

21. Apparatus as defined in claim 16 in which each of said gauge gears has a number of teeth at least equal to a multiple of the number of teeth on a work gear to be checked so as to perform a plurality of checks during a single rotation of said gauge spindle.

22. Apparatus as defined in claim 16 comprising means for measuring relative movement between said spindles in a direction generally radial of said work spindle.

23. A composite gear checker comprising a frame, a rotary work spindle, a rotary gauge spindle, means mounting one of said spindles on said frame for rotation in a fixed position, means mounting the other of said spindles on said frame for movement only generally radially of the axis of rotation of said one spindle, gauge gears on said gauge spindle comprising a first gauge gear fixed thereto and second and third gauge gears independently rotatable on said gauge spindle, fourth and fifth gauge gears independently rotatable on said gauge spindle, all of said gauge gears being dimensioned for meshing simultaneously with a single work gear, driving means for driving one of said spindles in rotation, and means for measuring relative angular displacement between said second and third gauge gears and between said fourth and fifth gauge gears.

24. A composite gear checker comprising a frame, a rotary work spindle, a rotary gauge spindle, means mounting one of said spindles on said frame for rotation in a fixed position, means mounting the other of said spindles on said frame for movement only generally radially of the axis of rotation of said one spindle, gauge gears on said gauge spindle comprising a first gauge gear fixed thereto and second and third gauge gears independently rotatable on said gauge spindle, fourth and fifth gauge gears independently rotatable on said gauge spindle, all of said gauge gears being dimensioned for meshing simultaneously with a single work gear, driving means for driving one of said spindles in rotation, and means for measuring the instantaneous angular position of said second to fifth gauge gears relative to said first gauge gear during rotation of said gauge spindle.

25. A composite gear checker comprising a frame, a rotary work spindle, a rotary gauge spindle, means mounting one of said spindles on said frame for rotation in a fixed position, means mounting the other of said spindles on said frame for movement only generally radially of the axis of rotation of said one spindle, gauge gears on said gauge spindle comprising a first gauge gear fixed thereto and scond and third gauge gears independently rotatable on said gauge spindle, all of said gauge gears being dimensioned for meshing simultaneously with a single work gear, a driving master gear fixed to said work spindle, driven master gear means on said gauge spindle in mesh with said driving master gear, and means for measuring relative angular displacement between at least some of said gauge gears.

26. Apparatus as defined in claim 25, said driven master gear means comprising a pair of master gears independently rotatable on said gauge spindle, a pivoted equalizer member carried by and rotatable with said gauge spindle and engaging each of the master gears of said pair, and resilient means acting solely between said pair of master gears to urge them in opposite directions of rotation.

27. Apparatus as defined in claim 26 comprising means for measuring the instantaneous angular position of each of the gears of said pair of master gears during rotation of said gauge shaft.

28. Involute checking apparatus comprising a work spindle for mounting a work gear thereon, a gauge spindle parallel to said work spindle, a gauge gear fixed to said gauge spindle in position to mesh with a work gear, a driving master on said work spindle, a pair of driven master gears independently rotatably mounted on said gauge spindle, resilient means acting between the gears of said pair of master gears urging them in rotation in opposite directions, equalizer means acting between the gears of said pair of master gears during rotation thereof and operable to provide only equal and opposite rotation thereof from a first position in which the teeth thereof are in alignment, means for measuring the instantaneous angular position of the gears of said pair of master gears during rotation thereof.

29. Apparatus as defined in claim 28 in which said gauge gear is positioned to mesh with the work gear at one end of its teeth, a pair of independently rotatable gauge gears on said gauge spindle having teeth positioned to mesh with the teeth of the work gear substantially midway between the ends thereof, and means for measuring the instantaneous angular position of each of said pair of gauge gears during rotation of said spindles.

30. Involute checking apparatus comprising a work spindle for mounting a work gear thereon, a gauge spindle parallel to said work spindle, a gauge gear fixed to said gauge spindle in position to mesh with a work gear, a driving master on said work spindle, driven master gear means on said gauge spindle in mesh with said driving master gear, said gauge gear having checking teeth and a plurality of teeth of reduced chordal thickness intermediate adjacent checking teeth, means for driving one of said spindles in rotation, and means responsive to entry of each of said checking teeth into mesh with the work gear to reduce the rate of rotation during passage of each checking tooth through the zone of mesh.

References Cited by the Examiner

UNITED STATES PATENTS

| | | | |
|---|---|---|---|
| 2,060,803 | 11/36 | Falk | 33—179.52 X |
| 2,726,455 | 12/55 | Saari | 33—179.52 |
| 2,726,456 | 12/55 | Pergande | 33—179.52 |
| 2,780,007 | 2/57 | Pomernacki | 33—129.52 |
| 2,815,581 | 12/57 | Strelow | 33—179.52 |
| 2,849,802 | 9/58 | Stapleton | 33—179.52 |
| 2,959,282 | 11/60 | Pomernacki | 33—179.52 X |

FOREIGN PATENTS

| | | |
|---|---|---|
| 601,612 | 8/34 | Germany. |

OTHER REFERENCES

German application No. KL. 42b, 26/02; Niemann, 1,086,903, printed August 1960.

ISAAC LISANN, *Primary Examiner.*